Sept. 2, 1941.   W. M. ZAROTSCHENZEFF   2,254,406
METHOD AND APPARATUS FOR QUICK FREEZING
Filed Oct. 27, 1938   2 Sheets-Sheet 1
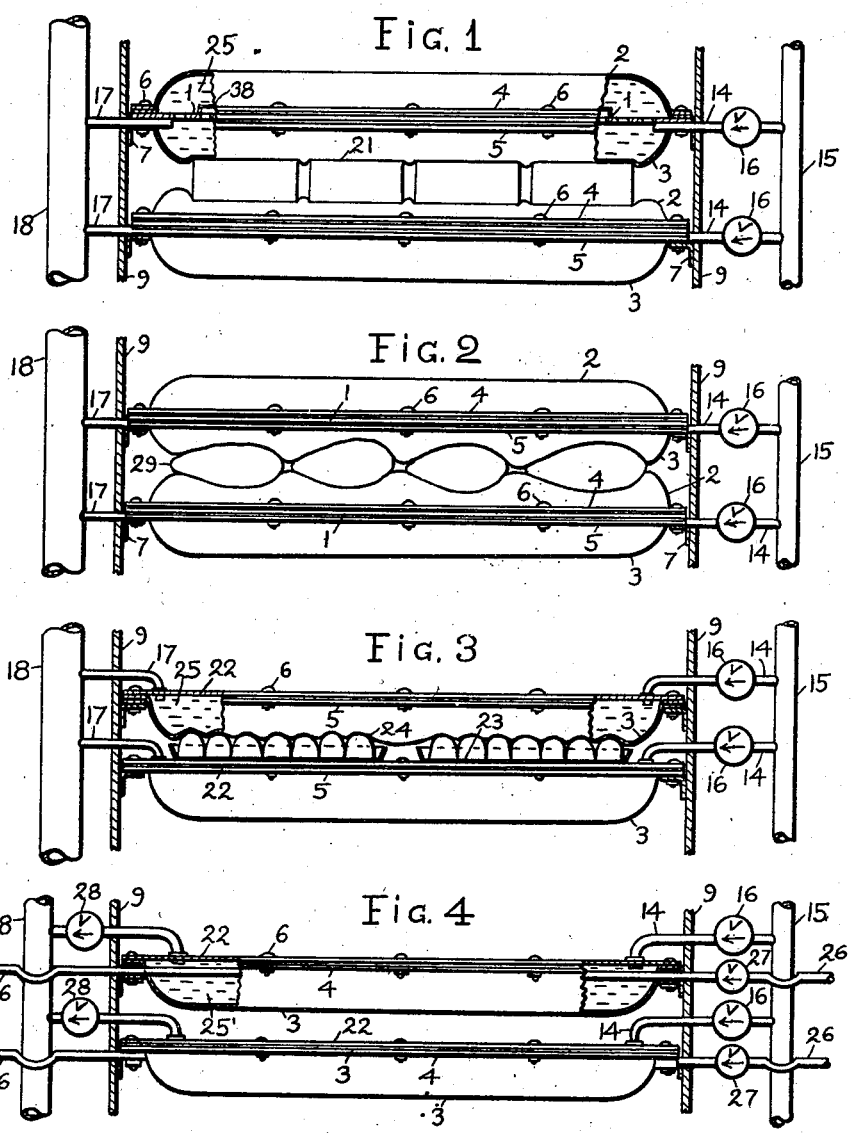
WLADIMIR M. ZAROTSCHENZEFF
INVENTOR.
BY   John P. Nikonov
ATTORNEY.

Sept. 2, 1941.  W. M. ZAROTSCHENZEFF  2,254,406
METHOD AND APPARATUS FOR QUICK FREEZING
Filed Oct. 27, 1938   2 Sheets-Sheet 2
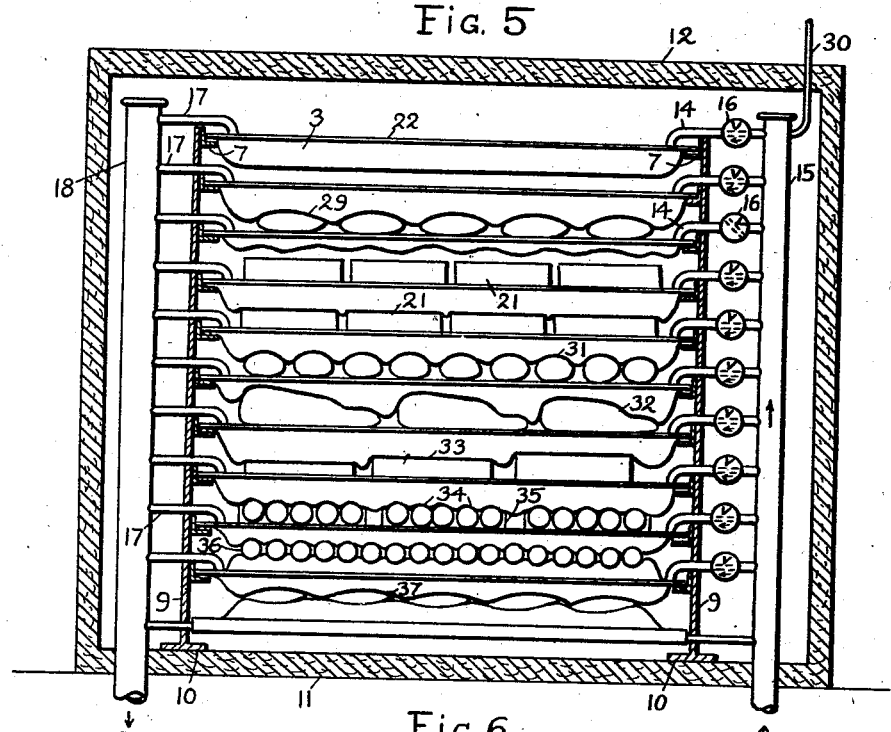
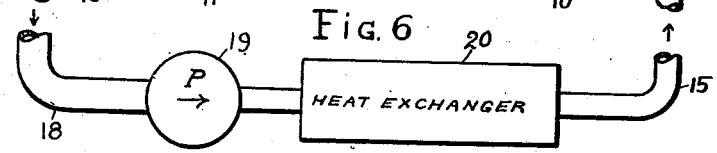
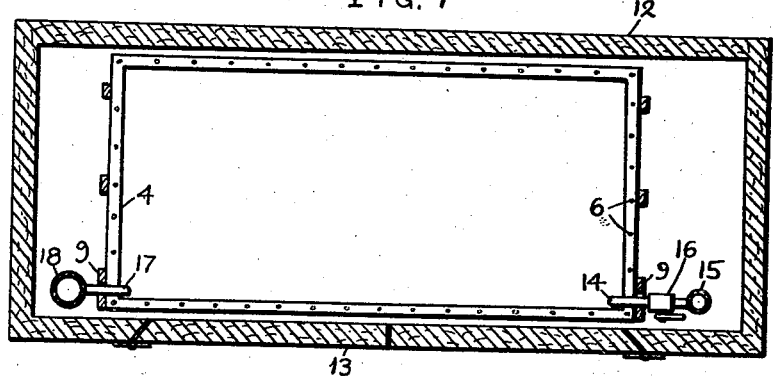
Wladimir M. Zarotschenzeff
INVENTOR.
BY John P. Nixon
ATTORNEY.

Patented Sept. 2, 1941

2,254,406

UNITED STATES PATENT OFFICE 2,254,406

METHOD AND APPARATUS FOR QUICK FREEZING

Wladimir M. Zarotschenzeff, Palisades, N. J., assignor to National Frosted Foods, Inc., New York, N. Y.

Application October 27, 1938, Serial No. 237,168

4 Claims. (Cl. 62—114)

This invention relates to methods and apparatus for quick freezing, and has particular reference to quick freezing of foodstuffs, such as meat, fish, etc.

Science and commercial practice recognize the benefits of rapid application of refrigeration, particularly for freezing of edible products. When flesh of fresh meat or fish is frozen rapidly, that is within two hours or less, the product on defrosting resembles most closely the original flesh in appearance and nutritive elements; whereas, when meat or fish flesh is frozen slowly, say over a period more than 24 hours, substantial changes occur which are irreversible, with the result that slow frozen products become much lower in quality from the consumer's point of view.

Various methods and apparatus have been proposed for rapid freezing, outstanding among which are the inventions of Clarence Birdseye and Mikail T. Zarotschenzeff. The former utilizes the principle of squeezing a uniform package with product to be frozen between parallel metal plates which are continuously refrigerated from within. This principle has been further worked out by Bicknell Hall who developed an apparatus having refrigerated metal plates between which product is squeezed under considerable pressure.

I have found that it is possible to eliminate the foregoing limitations by providing an apparatus in which objects to be frozen are placed between bags made of an impervious to liquids fabric through which circulates a liquid refrigerant, the pressure of the latter causing the fabric of the bags to closely envelop the objects. This arrangement has an advantage in that objects of various shapes and sizes can be efficiently subjected to the action of a cooling liquid, there being no necessity for separate or special containers for protecting the objects from direct contact with the refrigerant. The pressure of the liquid refrigerant may be relatively low so that no damage or deformation can be caused by this process.

One of the embodiments of my invention is more fully described in the accompanying specification and drawings in which—

Fig. 1 is a detail view of two cooling elements of my apparatus partly in section, supporting cartons or packages with objects to be frozen.

Fig. 2 is a similar view of the cooling elements used for freezing irregularly shaped objects.

Fig. 3 is a similar view of modified elements used for cooling small objects.

Fig. 4 is a similar view of another modification of the cooling elements.

Fig. 5 is an elevational view of my refrigerating machine.

Fig. 6 is a fractional detail view of a liquid supply system.

Fig. 7 is a sectional top plan view of my machine.

My machine consists of a plurality of cooling or refrigerating elements shown in Figs. 1 and 2. Each element has a perforated plate 1 which can be made of metal or other suitable material. The plate has flexible bags 2 and 3 attached at their edges to the edges of the plate by clamping frames 4 and 5 joined together by screws or bolts 6. The plates are supported on angle irons 7 mounted on vertical posts 9 with bottom flanges 10 (Fig. 5) mounted on a floor 11 of the machine. The bags are preferably made of a fabric impregnated with a water-proofing compound. I have found that satisfactory results are obtained when the fabric is treated with high grade latex rubber which remains soft and pliable at very low temperatures. Furthermore, rubber does not freeze to the flesh of refrigerated objects and is a relatively good heat conductor in a thin layer. Reference may be made to the well known rubber trays used in domestic refrigerators for freezing ice cubes. Such trays remain elastic for many years, are unaffected by low temperatures and readily release the frozen ice cubes without preliminary defrosting as is necessary with metal trays. Other kinds of rubber may be also used, as well as synthetic elastic composition, varnishes, etc.

Such a bag may be prepared from two flat sheets of latex treated fabric which are held tightly together at their edges by the frames 4 and 5 or the sheets may be formed as more or less deep bags.

The rack with the bags is placed in a housing 12 made of a heat insulating material such as composition asbestos board etc. with front doors 13. Intake pipes 14 are fitted into the bags at one end extending from a delivery header pipe 15 for a liquid refrigerant 25. Valves 16 are placed in the pipes 14 for controlling the flow of the refrigerant. Exhaust pipes 17 connect the other ends of the bags with an exhaust suction header pipe 18.

A pump 19 maintains the liquid refrigerant in circulation through a heat exchanger 20 of an ordinary type (Fig. 6). The elements are so spaced in the racks 7 that the opposite bags 2 and 3 closely approach each other when they are distended by the pressure of the circulating liquid. By closing a valve 16, the corresponding bag is emptied and caused to collapse so that objects (Figs. 1 and 5) or products 21 can be placed on the soft bag supported by the plate 1. The bag 3 of the next upper element may be also emptied by closing its valve 16 in order to facilitate the loading of the lower element with the objects or cartons 21. Upon completion of the loading, the valves are opened causing the bags to distend and to envelop the objects 21 with a slight pressure sufficient to produce a good contact of the bag with the sides of the objects, but insufficient to cause any damage to the objects even if they are placed in ordinary paper container, as may be the case with packed meat or fish fillets. The rubberized fabric of the bags is sufficiently flexible and elastic to cover and envelop various objects of an irregular shape such as poultry 29, whole fish, chunks of meat etc. as shown in Fig. 2.

A modified element is shown in Fig. 3 in which case it is formed with a solid plate 22 with a bag 3 supported underneath by a frame 5 and screws 6. The intake and exhaust pipes 14 and 17 are respectively fitted into the plate 22.

This arrangement is especially suitable for articles having flat bases such as single flat fish like sole or a metal pan filled with fish several inches deep. Such metal pans are standard in practically all cold storage plants engaged in freezing fish so that this particular modification permits the use of a standard equipment. Such metal pans 23 are shown filled with fish 24 in Fig. 3. It is a common practice to have water in the bottom of the pan so that there is a direct heat absorption from the fish by conduction through the metal pan and water around the fish while the upper sides of the fish are in direct contact with the fabric of the bags. A very efficient refrigeration is thereby obtained with this arrangement.

Another modification is shown in Fig. 4 in which direct expansion refrigeration coils or pipes 26 pass through the bags being provided with regulating valves 27. The refrigeration in this case is obtained through the combination of a primary or direct expansion refrigerant such as ammonia, carbon dioxide etc., passing through the pipes 26, and of a secondary refrigerant 25' filling the bags between the metal plates 22 and the fabric of the bags. The secondary refrigerant, which may be sodium or calcium chloride brine, may circulate through the bags or the circulation may be stopped by closing valves 16 and 28. The valves 28 can be also used for regulating the back pressure in the bags. The coils for the primary refrigerant may be added, of course, to the double bags shown in Figs. 1 and 2.

The arrangement of various elements in the machine is shown in Fig. 5. A vent pipe 30 is provided in order to remove or eliminate any air in the system and to adjust the level of the liquid in the circulating system.

It may be noted that each element can be loaded or unloaded independently of the others and while maintaining uninterrupted circulation of the refrigerant through other elements which are not being handled. Thus the third from the top element is shown disconnected from the circulation, its valve 16 being closed, so that its bag is shown collapsed, permitting discharge or removal of the packages 21 on the top plate of the next element below. Two elements are therefore required for freezing a charge of products although each element, with the exception of those located at the top and bottom of the machine, operates together with two others which are above and below. The elements are spaced so that the bags when filled approach closely the top plates of the adjacent lower elements and may even almost touch them, the upper plate 22 of one element forming a shelf for loading it with objects or products to be frozen. Various uses of these elements or shelves are shown in Fig. 5, as, for instance, freezing of oval objects 31 such as full drawn poultry wrapped in moisture proof cellulose wrappers, pork hams 32 or similar highly irregular objects, packages 33 of uneven thickness, round fish 34 in open boxes or pans 35, etc. Elements with two bags may be used to advantage for freezing small round or elongated objects such as corn on cob 36, in order to obtain a substantial contact over the whole surface with the fabric of the refrigerating elements. Flat fish 37 can also be conveniently and efficiently frozen between the adjacent bags 2 and 3.

If desired, the angle irons 7 may be made adjustable for varying distances between the elements in which case the pipes 14 and 17 may be made flexible. Additional perforate or imperforate plates 38 can be also provided in the bags in order to provide an additional support for the bags.

It is understood that this invention may be embodied in still other modifications within its scope as set forth in the appended claims.

I claim as my invention:

1. A freezing apparatus comprising a casing and a plurality of spaced refrigerating elements arranged therein, each of said elements consisting of a frame and a pair of opposed walls cooperating with the frame to provide an enclosed space in said element, means for supplying each of said cooling elements with a liquid refrigerant, and means for withdrawing the used refrigerant therefrom, said walls being made from a highly extensible resilient material having the characteristic of being able to conform at low temperatures substantially to the shape of the materials confronting the wall.

2. A freezing apparatus comprising a casing and a plurality of spaced refrigerating elements arranged therein, each of said elements consisting of a frame and a pair of opposed walls cooperating with the frame to provide an enclosed space in said element, means for supplying each of said cooling elements with a liquid refrigerant, and means for withdrawing the used refrigerant therefrom, said walls being made from a highly flexible waterproof resilient material having the characteristic of being able to conform at low temperatures substantially to the shape of the materials confronting the wall.

3. A freezing apparatus comprising a casing and a plurality of spaced refrigerating elements arranged therein, each of said elements consisting of a frame and a pair of opposed walls cooperating with the frame to provide an enclosed space in said element, means for supplying each of said cooling elements with a liquid refrigerant, means for withdrawing the used refrigerant therefrom, said walls being made from a highly flexible waterproof resilient material having the characteristic of being able to conform at low temperatures substantially to the shape of the materials confronting the wall, and conduits in the elements for circulating a secondary refrigerant through the elements.

4. A freezing apparatus comprising a casing and a plurality of spaced refrigerating elements arranged therein, each of said elements consisting of a rigid wall and a highly flexible wall, the walls being joined peripherally and forming a container, means to supply a liquid refrigerant into the container, the rigid wall being adapted to support articles to be refrigerated, the flexible wall of the next element above being adapted to envelope the upper sides of the articles when the containers are filled with the refrigerant.

WLADIMIR M. ZAROTSCHENZEFF.